(12) United States Patent
Cnossen et al.

(10) Patent No.: US 9,764,256 B2
(45) Date of Patent: Sep. 19, 2017

(54) REMOVAL DEVICE FOR MICRO-BUBBLES AND DIRT PARTICLES

(75) Inventors: Jan Henk Cnossen, Koudum (NL); Terence Arthur Devlin, Apeldoorn (NL)

(73) Assignee: Flamco B.V., Bunschoten (NL)

( * ) Notice: Subject to any disclaimer, the term of this patent is extended or adjusted under 35 U.S.C. 154(b) by 256 days.

(21) Appl. No.: 14/000,052

(22) PCT Filed: Feb. 17, 2012

(86) PCT No.: PCT/NL2012/050092
§ 371 (c)(1),
(2), (4) Date: Nov. 18, 2013

(87) PCT Pub. No.: WO2012/112049
PCT Pub. Date: Aug. 23, 2012

(65) Prior Publication Data
US 2014/0054234 A1    Feb. 27, 2014

(30) Foreign Application Priority Data

Feb. 17, 2011 (NL) .................................... 2006225
Feb. 17, 2011 (NL) .................................... 2006226
Feb. 17, 2011 (NL) .................................... 2006227

(51) Int. Cl.
*B01D 21/00* (2006.01)
*B01D 17/02* (2006.01)
(Continued)

(52) U.S. Cl.
CPC ...... *B01D 21/0042* (2013.01); *B01D 17/0211* (2013.01); *B01D 19/0042* (2013.01);
(Continued)

(58) Field of Classification Search
CPC .............. B01D 21/245; B01D 21/2494; B01D 21/2411; B01D 17/0211; B01D 19/00;
(Continued)

(56) References Cited

U.S. PATENT DOCUMENTS 1,927,410 A    9/1933    Marsh
4,589,984 A    5/1986    Legrand et al.
(Continued)

FOREIGN PATENT DOCUMENTS

CN    101254363 A    9/2008
EP    0244881 A1    11/1987
(Continued)

OTHER PUBLICATIONS

English Translation CN 101254363 A.
English Translation EP 1745832 A1.
English Translation FR 2536672 A1.

*Primary Examiner* — T. Bennett McKenzie
(74) *Attorney, Agent, or Firm* — Hoffmann & Baron, LLP

(57) ABSTRACT

A removal device for removing gas bubbles and/or dirt particles from a liquid in a liquid conduit system includes a housing having an entry and an exit and, a main ongoing flow channel which extends through the housing from the entry to the exit, a plurality of branch flow channels, each branch flow channel branching off from the main flow channel at a branch point, at least one quiet zone which is provided at the ends of the branch flow channels, at least one return flow channel for a return flow from the at least one quiet zone back to the main flow channel, where the return flow channel merges with the main flow channel at a merge point, and where the branch flow channels are defined by plates which are curved.

6 Claims, 11 Drawing Sheets

(51) Int. Cl.
*B01D 19/00* (2006.01)
*B01D 21/24* (2006.01)
*F24D 19/00* (2006.01)

(52) U.S. Cl.
CPC ....... *B01D 21/0045* (2013.01); *B01D 21/245* (2013.01); *B01D 21/2494* (2013.01); *F24D 19/0092* (2013.01)

(58) Field of Classification Search
CPC ............ B01D 19/0042; B01D 19/0092; B01D 21/00; B01D 21/0042; B01D 21/0045; B01D 21/0039–21/0075
USPC .................................................. 210/188, 718
See application file for complete search history.

(56) References Cited

U.S. PATENT DOCUMENTS

| | | | |
|---|---|---|---|
| 5,858,252 A | 1/1999 | Darcy | |
| 6,214,096 B1 | 4/2001 | Kwak | |
| 6,758,978 B1 | 7/2004 | Bedell | |
| 7,117,888 B2 | 10/2006 | Niekolaas et al. | |
| 2001/0023845 A1 | 9/2001 | Lacasse et al. | |
| 2005/0218070 A1 | 10/2005 | Seregin et al. | |
| 2009/0078118 A1* | 3/2009 | Kooijman | ......... 96/207 |
| 2010/0236409 A1 | 9/2010 | Cnossen | |

FOREIGN PATENT DOCUMENTS

| | | | | |
|---|---|---|---|---|
| EP | 1612489 A1 | | 1/2006 | |
| EP | 1745832 A1 | | 1/2007 | |
| EP | 2266676 A1 * | | 12/2010 | ......... B01D 17/0211 |
| FR | 2536672 A1 | | 6/1984 | |
| JP | 52-81770 A | | 7/1997 | |
| SU | 946591 A1 | | 7/1982 | |
| SU | 1277992 A1 | | 12/1986 | |
| SU | 1712319 A1 | | 2/1992 | |
| WO | 2011037465 A1 | | 3/2011 | |
| WO | WO 2011037465 A1 * | | 3/2011 | ......... B01D 21/0045 |

* cited by examiner

REMOVAL DEVICE FOR MICRO-BUBBLES AND DIRT PARTICLES

CROSS-REFERENCE TO RELATED APPLICATIONS

This application is the National Stage of International Application No. PCT/NL2012/050092, filed Feb. 17, 2012, which claims the benefit of Netherlands Application Nos. NL 2006225, filed Feb. 17, 2011, NL 2006226, filed Feb. 17, 2011, and NL 2006227, filed Feb. 17, 2011, the contents of all of which is incorporated by reference herein.

FIELD OF THE INVENTION

The present invention relates to a removal device for gas micro-bubbles and dirt particles from a liquid in a liquid conduit system. Removal devices are known. The present invention further relates to an improved hydraulic separator.

PRIOR ART

In the prior art, various removal devices for dirt particles and gas micro-bubbles have been developed. EP0244881A1 discloses a removal device with ongoing flow channels 3, see FIG. 1 of EP0244881A1. The flow channels 3 are defined by longitudinal baffles 2 which are inclined. At the upper end and lower end of the flow channels 3, lateral baffles 11, 12 are provided which define branch channels which end in collecting chambers 7 and 8.

It was found that the flow in the removal device according to FIG. 1 of EP0244881A1 has a disadvantageous form. Further, the longitudinal baffles 2 are complex and lead to high manufacturing costs.

Furthermore, it was found that the removal device according to FIG. 1 of EP0244881A1 is limited in terms of installation capabilities. The removal device of EP0244881A1 is in particular less suitable for smaller houses and buildings, wherein a heating system generally has limited piping in horizontal direction.

SUMMARY OF THE INVENTION

The present invention relates to a removal device for removing gas bubbles and/or dirt particles from a liquid in a liquid conduit system, the removal device comprising:
  a housing having an entry and an exit and, the housing defining an inner space within the housing,
  a main ongoing flow channel which extends through the housing from the entry to the exit,
  a plurality of branch flow channels, each branch flow channel branching off from the main flow channel at a branch point, the branch flow channels being configured to—in use—branch off a small portion from a main flow,
  at least one quiet zone which is provided at the ends of the branch flow channels, such that in use the branch flow channels discharge into the at least one quiet zone, wherein the dimensions of the quiet zone is chosen relative to the combined discharge of the branch flow channels in such a way that in use, the velocity of the liquid in the at least one quiet zone is substantially smaller than in the main flow channel and small enough to allow dirt to settle and/or gas bubbles to form and rise in the at least one quiet zone,
  at least one return flow channel for a return flow from the at least one quiet zone back to the main flow channel, wherein the return flow channel merges with the main flow channel at a merge point,
  wherein the branch flow channels are defined by plates which extend from the main flow channel to the at least one quiet zone, wherein the plates are curved.

With the present invention, the incoming main flow is more evenly distributed over the width of the housing. The curved plates urge a part of the main flow sideways, to the left and right sides of the housing. This results in a more effective gas and dirt removal.

The curved plates are provided below the main flow channel for the dirt removal and/or above the main flow channel for gas removal.

The main ongoing flow channel starts at the inlet and ends at the outlet and extends through the housing.

In an embodiment, the branch flow channels have a cross-section with a curved form.

In an embodiment, the plates have edges at the side of the main flow channel, wherein an entrance of each branch flow channel is located between the edges of adjacent plates, wherein a central flow axis of the main flow channel extends from a center of the entry to a center of the exit, wherein the edges have a curved form, such that—when seen in top view—an angle $\alpha 1$ between the central flow axis and the edges varies over the width of the main flow channel.

The edges urge a part of the main flow sideways, such that the main flow is more evenly distributed over the width of the housing.

In an embodiment, a center portion of the plates is oriented at a substantially right angle with the central flow axis, and wherein an angle between the plates and the central flow axis decreases with an increasing distance from the center portion of the plate.

It was found that this form provides a good distribution of the main flow over the width of the housing.

In an embodiment, the plates have a convex form when viewed in the direction of the main flow. In an embodiment, in top view the plates have a form of a part of a circle or part of an oval. In an embodiment, in top view the housing has a substantially circular form, and wherein the curved plates extend from a left side of the housing to a right side of the housing.

These forms are simple, cost-efficient in production and provide good results.

The present invention also relates to a removal device for removing gas bubbles and/or dirt particles from a liquid in a liquid conduit system, the removal device comprising:
  a housing having an entry and an exit and, the housing defining an inner space within the housing,
  a main ongoing flow channel which extends through the housing from the entry to the exit,
  a plurality of branch flow channels, each branch flow channel branching off from the main flow channel at a branch point,
  at least one quiet zone which is provided in the housing at the ends of the branch flow channels, such that in use the branch flow channels discharge into the at least one quiet zone, wherein the dimensions of the quiet zone is chosen relative to the combined discharge of the branch flow channels in such a way that in use, the velocity of the liquid in the at least one quiet zone is substantially smaller than in the main flow channel and small enough to allow dirt to settle and/or gas bubbles to form in the at least one quiet zone,
  at least one return flow channel for a return flow from the at least one quiet zone back to the main flow channel, wherein the return flow channel merges with the main flow channel at a merge point.

wherein the entry is provided at a lower region of the housing and the exit is provided at an upper region of the housing.

At least a part of the main flow channel extends in a substantially upward direction.

The removal device according to the invention is better suitable for small houses and buildings than removal devices according to the prior art. In small houses and buildings, there generally is only a limited length of horizontal main pipeline. In these conditions, it is often required to mount the removal device in a vertical section. The removal device according to the invention provides this capability.

In an embodiment, the entry and the exit are oriented substantially vertically. This allows placement without any curves in the pipeline in which the removal device is mounted.

In an embodiment, the entry and the exit are aligned with one another. This embodiment allows a very easy insertion into a vertical pipeline, without any offset-pieces.

In an embodiment, a part of the main flow channel has an upwardly inclined orientation, and wherein a plurality of branch flow channels branch off from the main flow channel in the upwardly inclined part thereof.

This allows a simple internal construction of the removal device.

In an embodiment, the removal device comprises:
  at least one quiet zone adapted for dirt removal, wherein the branch flow channels which extend between the main flow channel and the quiet zone for dirt removal branch off from the main flow in the inclined region of the main flow channel,
  and/or
  at least one quiet zone adapted for removal of gas bubbles, wherein the branch flow channels extending between the main flow channel and the quiet zone for gas bubbles removal branch off from the main flow in the inclined region of the main flow channel.

With this arrangement, the main flow can travel upwards while at the same time the branch flows can branch off from the main flow.

In an embodiment, the removal device comprises a main central axis which extends substantially vertically, wherein the removal device is substantially symmetric about said main central axis. This symmetrical form allows a simple construction, and relatively low costs. In top view, the removal device has a circular form.

In an embodiment, the removal device comprises a main central axis which is oriented substantially vertically, and
  wherein the inclined part of the main flow channel has a frustoconical form, and/or
  wherein a plurality of branch off channels have a frustoconical form.

The frustoconical form provides an efficient liquid flow, with a low friction loss and good dirt and gas removal.

In an embodiment, the branch flow channels which end in the removal zone for dirt extend downwardly from the main flow channel and outwardly away from the main central axis, and/or wherein the branch flow channels ending in the gas bubble removal zone extend upwardly from the main flow channel and inwardly towards the main central axis.

In this arrangement, good use is made of the internal volume which is available. The housing can be a cylindrical vessel with a vertical central axis. The housing can be relatively small.

In an embodiment, the removal device comprises a bifurcation point wherein the main flow channel is diverted around a central obstacle, and wherein the quiet zone for gas bubbles removal is located substantially above the central obstacle.

This arrangement further improves the use of the available volume within the housing.

In an embodiment, the quiet zone for dirt removal is annular and extends around the main central axis and around the entry. The annular form of the quiet zone enables substantially the entire bottom end of the housing to function as a quiet zone.

In an embodiment, the removal device comprises a bifurcation point at a central obstacle in the main flow channel, wherein the main flow channel extends to either side of the central obstacle, and wherein the quiet zone for gas bubbles removal is located above the central obstacle.

The central obstacle defines the way the volume within the housing is used. The central obstacle diverts the main flow sideways, and allows a central quiet zone for gas removal to be positioned centrally in the housing.

The present invention also relates to a hydraulic separator. Hydraulic separators are known.

U.S. Pat. No. 7,117,888, EP1612489 show examples of hydraulic separators. A hydraulic separator is used in liquid conduit systems having a primary and a secondary circuit, and is capable of balancing the flow in case of a sudden variation in the discharge in the primary or secondary circuit, i.e. in case of unsteady flow. The hydraulic separator creates a fluid communication between a supply conduit via which a liquid travels from the primary circuit to the secondary circuit and a return conduit via which the liquid travels from the secondary circuit back to the primary circuit.

In steady flow conditions, there is no or substantially no leak flow between the supply conduit and the return conduit. In unsteady flow, a leak flow occurs for a limited amount of time in order to balance the discharges and to prevent high peak pressures to occur in the system. The leak flow diminishes and stops quickly once the flow becomes steady again.

In known hydraulic separators, the leak flow may become too large. This is a disadvantage.

The invention provides a hydraulic separator for balancing varying flows in a primary liquid circuit and a secondary liquid circuit, the hydraulic separator comprising:
  a housing which defines an inner space,
  an upper entry and an upper exit located in an upper region of the housing and
  a lower entry and a lower exit located in a lower region of the housing,
  the upper entry and lower exit being constructed to be connected to a primary liquid circuit and the upper exit and lower entry being constructed to be connected to a secondary liquid circuit,
  wherein a fluid communication channel is provided between the upper region and the lower region, such that when in use the flow in the primary or secondary circuit suddenly varies, a leak flow is allowed to occur between the upper entry and lower exit or between the lower entry and upper exit, for balancing the flows,
  wherein at least one flow obstruction member is provided in the fluid communication channel between the upper region and the lower region, the flow obstruction member defining a passage having a cross-sectional area which is substantially smaller than the cross-sectional area of the fluid communication channel.

In an embodiment, the hydraulic separator comprises a flow obstruction member in the upper region and a flow obstruction member in the lower region.

In an embodiment, the upper exit comprises a short section of pipe which extends outwardly away from the housing, and an upper flow obstruction member has a form which corresponds substantially with a lower part of said pipe, and/or the lower entry or exit comprises a short section of pipe which extends outwardly away from the housing, and a lower flow obstruction member has a form which corresponds substantially with an upper part of said pipe.

In an embodiment, the at least one flow obstruction member has a form which is substantially the same as a lower half of a pipe forming an entry or an exit, and is formed as an extension of one half of said pipe into the housing and to the opposite wall of the housing.

In an embodiment, the fluid communication channel is defined by the housing, and wherein the flow obstruction member defines at least one passage between the flow obstruction member and the housing.

In an embodiment, the at least one flow obstruction member extends from one side of the housing to an opposite side of the housing, thereby defining two passages, one passage on either side of the flow obstruction member.

BRIEF DESCRIPTION OF THE DRAWINGS

The previous and other features and advantages of the present invention will be more fully understood from the following detailed description of exemplary embodiments with reference to the attached drawings.

DETAILED DESCRIPTION OF THE INVENTION

Figure 1:
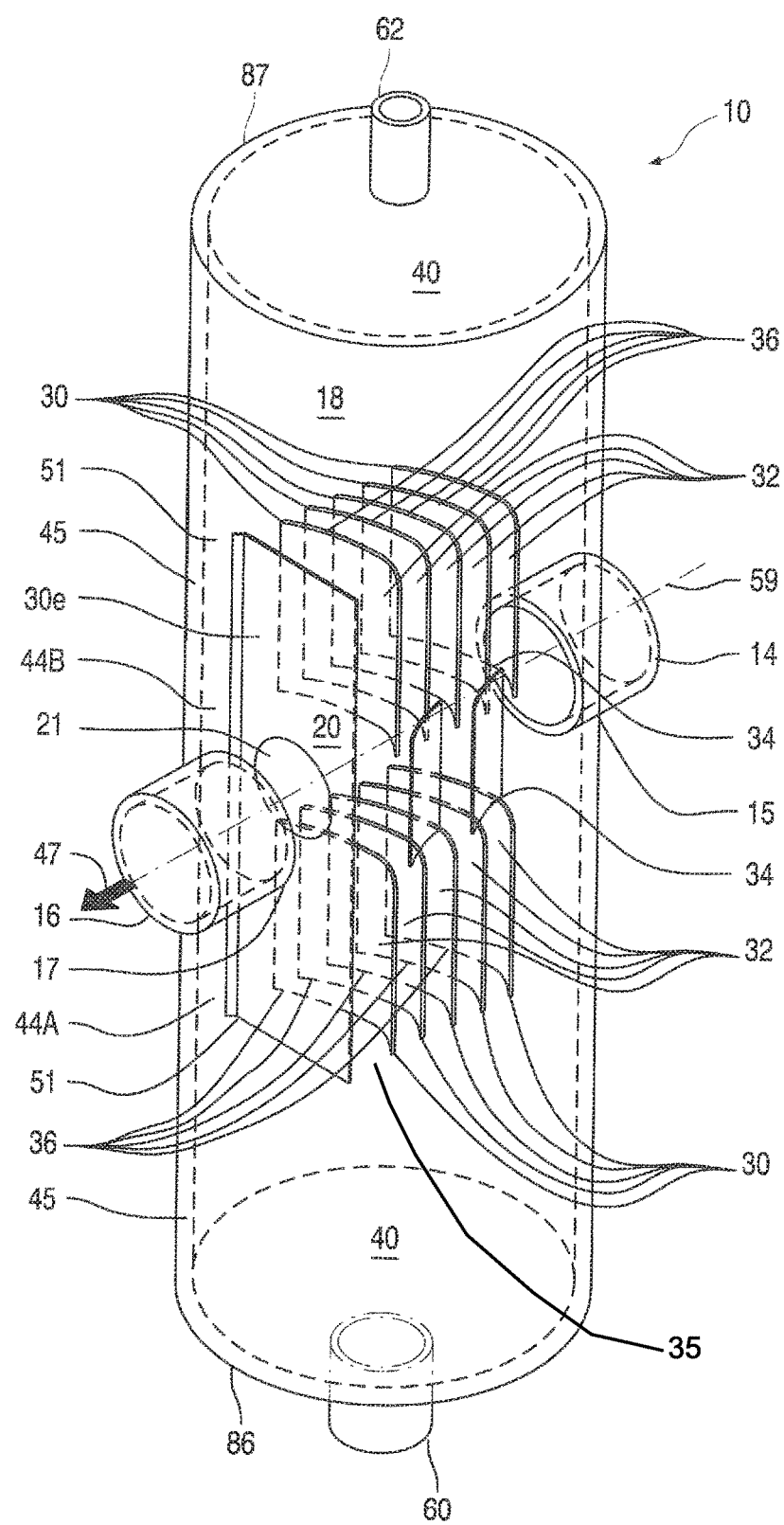
FIG. 1 shows an orthogonal view of a dirt and gas removal device according to the invention.
Figure 2:
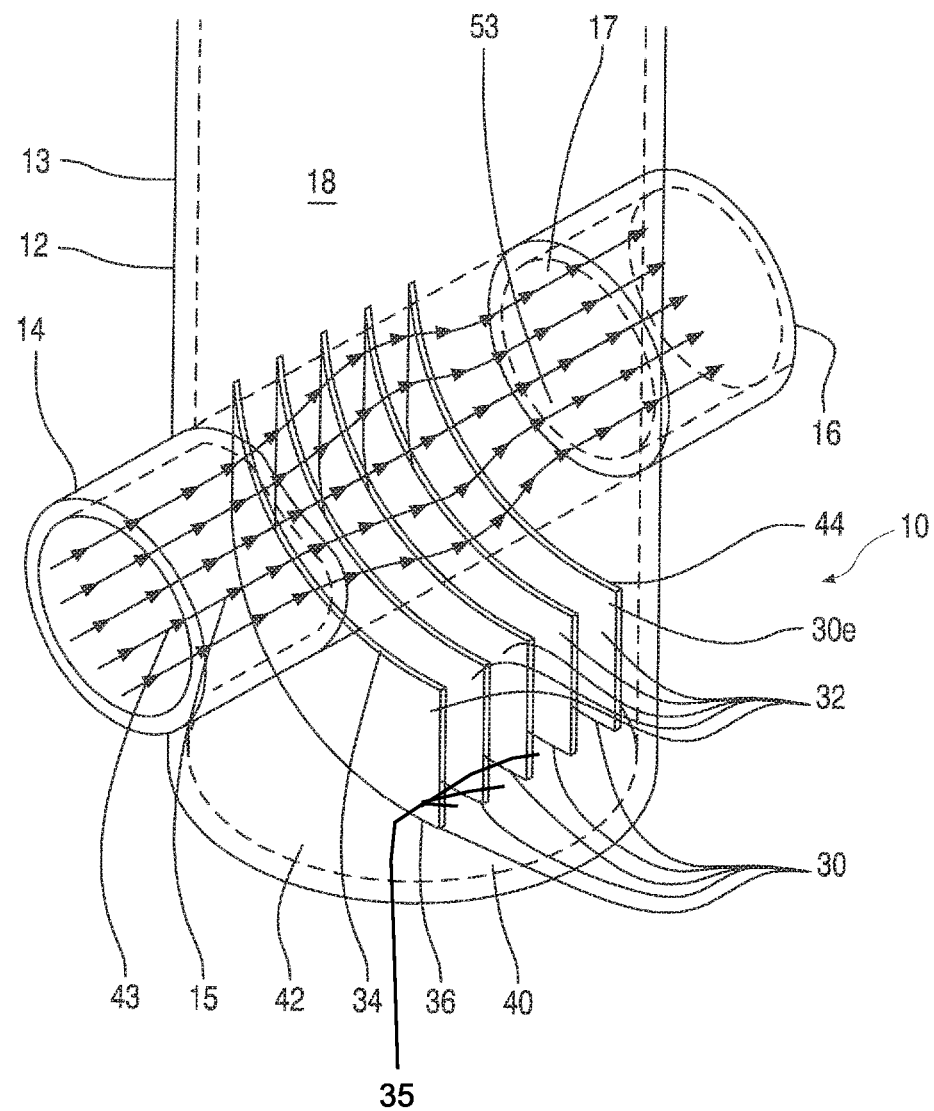
FIG. 2 shows an orthogonal view of another embodiment of a dirt and gas removal device according to the invention.

Turning to FIG. 1, a dirt and gas removal device 10 according to the invention is shown. The dirt removal device 10 comprises a housing 12, an entry 14 and an exit 16. The housing 12 defines an inner space 18. In this embodiment, the housing is circular when seen in top view. Other forms of the housing are possible, such as an oval or square form or other form. In top view, a wall 13 forms a circumferential wall of the housing 12.

The entry 14 comprises a short length of pipe which ends at the housing 12 and defines an entry opening 15 in the housing. The exit 16 also comprises a short length of pipe which ends at the housing and defines an exit opening 17 in the housing. The entry 14 and exit 16 have couplings such as thread which allow connection to a liquid conduit system, such as a heating system. Other kinds of couplings which are known in the field are also possible.

A main flow channel 20 is defined between the entry opening 15 and the exit opening 17. The main ongoing flow channel starts at the inlet and ends at the outlet and extends through the housing. A main flow axis 59 is defined as extending from a center of the entry 14 to a center of the exit 16. A main flow direction 47 corresponds to the main flow axis 59.

A number of plates 30 are provided directly below the main flow channel 20. The plates 30 define branch flow channels 32. The plates 30 have respective upper edges 34 and respective lower edges 36. The plates extend in a horizontal direction from one side 38 of the housing to an opposite side 39 of the housing 12. The plates 30 are oriented substantially vertically.

The edges 34 define the entrance to 33 the branch flow channels 32, also referred to as a branch point 33. The edges 36 define the ends 35 of the branch flow channels 32.

The branch flow channels 32 extend substantially parallel to one another. A plurality of branch flow channels 32 end in a lower quiet zone 40. The cross-section 27 of the branch flow channels is elongate, i.e. has two long sides and two short sides. The long sides are defined by the plates and are curved. The short sides are defined by the walls 38, 39 of the housing 12.

The main flow channel 20 has a varying width 29.

The lower quiet zone 40 is located beneath the lower edges 36 of the plates 30. The lower quiet zone 40 is constructed to allow settlement of dirt particles 42. The quiet zone 40 is defined between a bottom of the housing, the wall 13 of the housing and the lower edges 36 of the plates 30.

Further, curved plates 30 are positioned above the main flow channel 20 and define upwardly extending branch flow channels 32. These curved plates 30 also have edges 34, 36 which define the beginning respectively the end of branch flow channels 32 which lead to an upper quiet zone 40.

The main flow channel 20 is free of obstacles between the entry opening 15 and the exit opening 17.

The plates 30 have a curved form. The plates 30 are convex when viewed in the direction of the main flow. A center portion of the plates extends at a right angle to the main flow axis 59, when seen in top view.

The portions of the plates 30 which are further away from the center portions extend at an angle α1 to the main axis 59 of the main flow channel 20.

The plates 30 form a series of plates which define a series of branch flow channels 32.

A first plate 30 is located at a distance 48 from the entry opening 15. This distance 48 allows a widening of the incoming flow in a widening zone 49.

A return channel 44A is defined between a last (or most downstream) plate 30e and an end portion 45 of the wall 13 of the housing. The last plate 30e may be straight, as is shown in FIG. 1. The last plate 30e provides a constricted passage 21 in the main flow channel 20. The return channel 44A has an entrance 51 which is located at the quiet zone 40 and ends at the main flow channel 20. The return channel 44A from the lower quiet zone 40 extends substantially upwards and the return channel 44B from the upper quiet zone 40 extends substantially downwards. The return channels 44A, 44B are separate from the branch flow channels 32.

The upper edges 34 of the plates 30 are located below a lowest point 43 of the entry opening 15. The plates 30 have a height 50. The height of the plates 30 increases in the direction of the flow, see FIG. 3. Plate 30a has a smaller height than plate 30b, which has a smaller height than plate 30c, etcetera.

A dirt discharge 60 is provided at the bottom end 86 of the housing and a gas discharge 62 is provided at the upper end 87 of the housing 12

Turning to FIGS. 2, 3, 4 and 5, another embodiment of the invention is shown. A lower part of a hydraulic separator is shown, having a dirt removal device at a lower end thereof. The plates 30 are substantially the same as in the embodiment of FIG. 1. The last plate 30e is curved.

Figure 4:
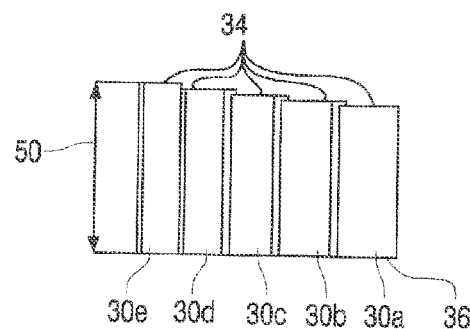
FIG. 4 shows a side view of the plates defining the branch flow channels of a dirt and gas removal device according to FIG. 2.
Figure 5:
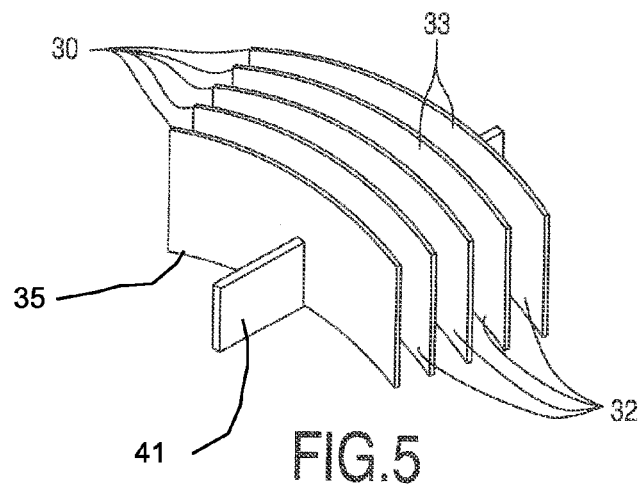
FIG. 5 shows an orthogonal view of the plates defining the branch flow channels of a dirt and gas removal device according to FIG. 2.

FIG. 4 shows that the plates 30 may be connected to one another via a connection member 41. This allows a simple placement or removal of the plates 30 in the housing 12, i.e. as a single unit.

In use, the dirt and gas bubbles removal device 10 is mounted in a liquid conduit system such as a heating system for a building or a house. A different liquid conduit system is also possible. A flow of liquid is pumped through the removal device 10.

Figure 3:
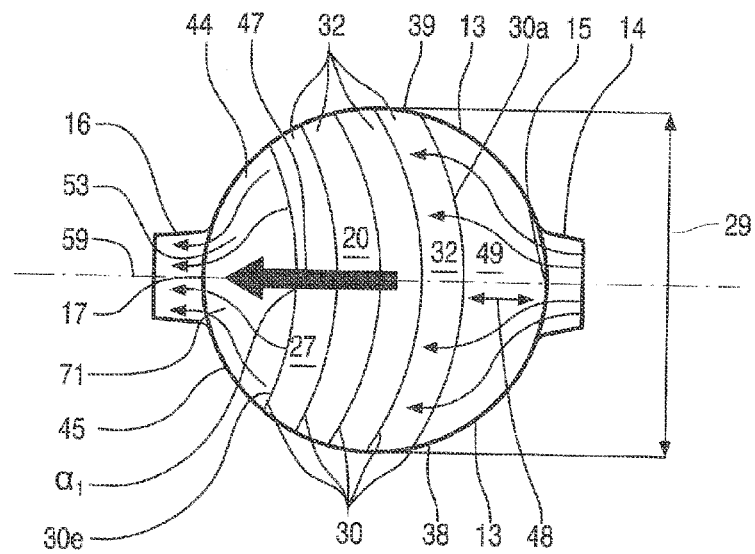
FIG. 3 shows a schematic top view of the branch flow channels of the embodiment of FIG. 2.

A main flow flows through the entry opening into the housing and widens in the widening zone 49. This is best seen in FIG. 3. The main flow then crosses the first plate 30a. A first branch flow branches off from the main flow and flows downward, into the branch flow channel 32.

It is noted that the major part of the total discharge, i.e. more than 50 percent of the total discharge entering the housing, stays in the main flow channel 20 and flows directly to the exit 16. Therefore, the main flow channel 20 is defined as the flow channel which carries more than 50 percent of the total discharge which enters the housing directly to the exit 16 of the housing.

The branch flow exits the branch flow channel 32 at the bottom, near the bottom edges 36. The branch flow subsequently enters the bottom quiet zone 40. This happens for each branch flow channel 32.

Because a cross-section of the quiet zone(s) 40 is relatively large, the velocity of the liquid in the quiet zone 40 is rather small. Turbulence is avoided in the quiet zone 40. The velocity is small enough to allow dirt particles to settle on the bottom of the housing and gas particles to rise.

In use, the constricted passage 21 creates a pressure drop. The pressure drop is the driving force for creating the branch flows and the subsequent return flow via the return channel 44 and the merging with the main flow at the merge point 53.

The direction of the ongoing flow in the main flow channel may vary locally over the inner space. First, the main flow widens in the widening zone 48. Then, the main flow crosses the plates 30 and the branch flow channels 32. Next, the main flow contracts in a contracting zone 71. The merge point 53 is located at the contracting zone 71.

The curved form of the plates 30 has an effect that the incoming main flow is widened better than with straight plates. This means that the areas in the inner space which are located close to the side wall 38, 39 are put to better use. In other words, the main flow is more evenly distributed over the entire width of the inner space of the housing 12 due to the curvature of the plates 30.

Furthermore, the widening of the main flow channel 20 allows the velocity of the main flow to decrease. Dirt particles will have the tendency to already start settling in the main flow channel and therefore quite naturally "slip" through the lower plates 30 into the lower branch channels 32 and into the lower quiet zone 40.

In the same way, gas bubbles will already rise in the main flow channel and "slip" into the upper branch flow channels 32.

This results in a removal of dirt particles and micro-bubbles which is more effective.

Figure 6:
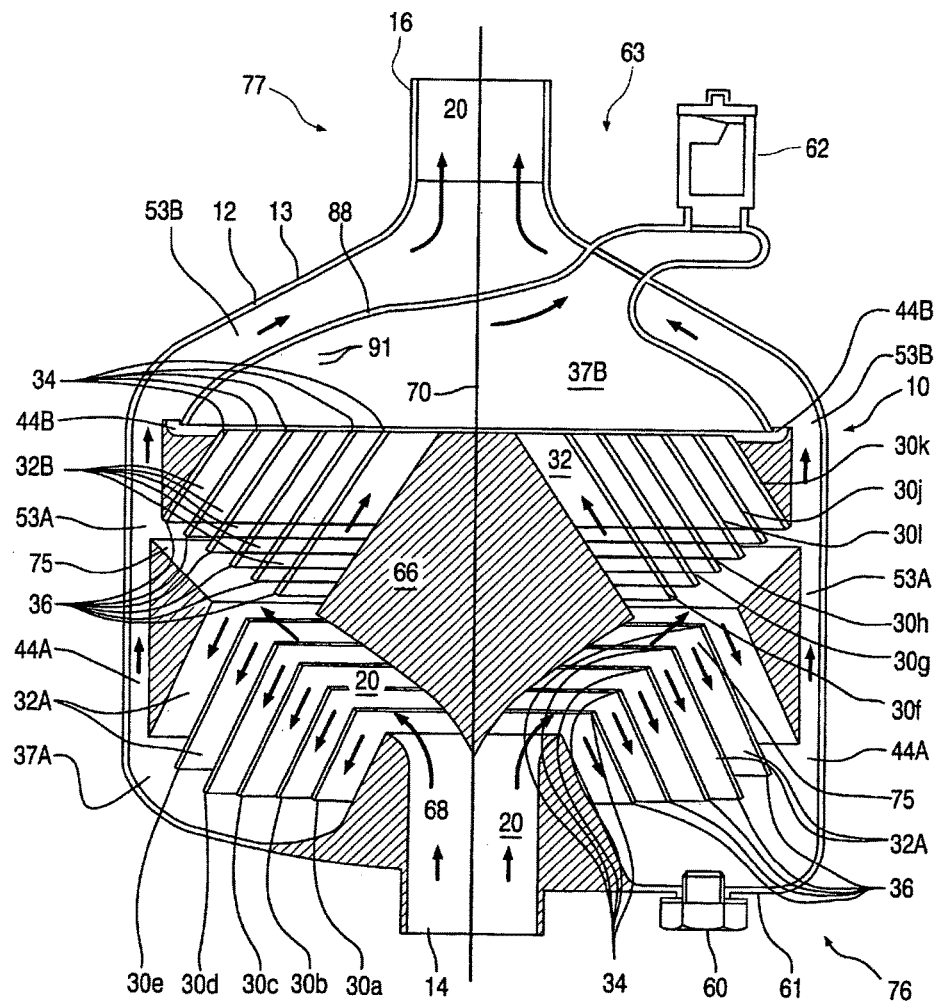
FIG. 6 shows a cross-section in side view of a vertically oriented dirt and gas removal device according to a second aspect of the invention.

Turning to FIG. 6, another embodiment of a gas and dirt removal device 10 is disclosed. The gas and dirt removal device 10 has an entry 14 at a bottom region 76 thereof. An exit 16 is provided at an upper region 77 thereof. The housing 12 has a substantially cylindrical form, such that in top view the removal device is circular.

The entry 14 and exit 16 are oriented vertically. The entry 14 and exit 16 are aligned with one another. This allows easy installation in a vertical conduit. In particular in smaller houses, main conduits in a heating system extend primarily vertically. A dirt and gas removal device with a horizontal entry and exit is not very practical in these conditions.

A dirt discharge 60 is provided at a bottom end 61 and a gas discharge device 62 is provided at an upper end 63 of the removal device. The dirt discharge 60 and gas discharge 62 are associated with respectively a quiet zone 37A for dirt settling and a quiet zone 37B for rising of micro bubbles. The dirt discharge 60 and gas discharge 62 are known in the prior art.

The quiet zone 37 is separated from the main flow channel 20.

Between the entry and the exit, at least a part of the main flow channel 20 extends in a substantially upward direction.

A central obstacle 66 is provided in the interior of the housing which creates a bifurcation point 68. From here, the main flow channel 20 extends in an inclined direction. This section is the inclined part 75 of the main flow channel 20.

The inclined part 75 of the main flow channel has a substantially frustoconical shape. The inclined part 75 of the main flow channel may also be likened to a coned disc. The inclined part 75 is symmetrical about a central vertical axis 70 of the dirt and gas removal device 10. The main axis 70 extends vertically.

A number of plates 30a-30e define branch flow channels 32A leading to a quiet zone 37A for dirt settlement. The branch flow channels 32A extend downward in an inclined orientation. The branch flow channels 32 extend inwardly, toward a main axis 70.

The bottom of the dirt settlement zone 37A is inclined and at the lowest point, the dirt discharge 60 is located.

A return channel 44A extends from the quit zone 37A upwards to the exit 16. The return channel 44A has an annular cross-section and merges with the main flow channel 20 at a merge point 53A.

A number of plates 30f-30k define branch flow channels 32B leading to a quiet zone 37B for gas removal. The plates 30f-30k and the branch flow channels 32B there between extend upward in an inclined orientation. The quiet zone 37B for gas removal has a substantially circular shape, when viewed in top view. In top view, the quiet zone 37 is located centrally in the housing 12. In top view, the main flow channel 20 is annular at the level of the quiet zone 37b, and is coaxial with the quiet zone 37b.

The quiet zone 37B is located in an upper region 77 of the dirt and gas removal device and is defined by a partition 88. The partition 88 is inclined and at the uppermost point, the gas discharge 62 is located.

A return channel 44B provides a return route for the liquid from the quiet zone 37B back to the main flow 20. The return channel 44B merges with the main flow in a second merge point 53B.

The branch flow channels 32A, 32b have a frustoconical form. The plates 30a-30k also have a frustoconical form. The plates 30 have upper edges 34 and lower edges 36. The upper edges 34 have different positions to the inclined part 75 of the main flow channel, i.e. increasing "heights", similar to FIG. 3. This allows a small branch flow to be "scraped" from the main flow by each plate 30.

The removal device 10 is substantially symmetrical about the central vertical axis 70. The main flow channel 20 extends upwardly and outwardly with respect to the central vertical axis 70.

In use, the main flow enters the dirt and gas removal device 10 via the entry 14. The main flow bifurcates at the bifurcation point 68, and flows into the inclined part 75 of the main flow channel.

Branch flows 32A are diverted into the branch flow channels 32A and arrive in the dirt settlement zone 37A. Here, the dirt settles and slides toward the discharge 60.

From the quiet zone 37A, the flow returns via the return channel 44A and merges with the main flow in the merge point 53A.

At the same time, branch flows 32B are diverted into branch flow channels 32B. The branch flows end in the quiet zone 37B for gas removal. Here, micro-bubbles 91 have the chance to rise and collect near the partition 88. The bubbles 91 eventually are discharged via the gas discharge 62. Via the return channel 44B, the liquid merges with the main flow 20 at a second merge point 53B and flows upward, toward the exit 16.

The major part of the total discharge, i.e. more than 50 percent of the total discharge entering the housing, stays in the main flow channel 20 and flows directly to the exit 16. Therefore, the main flow channel 20 is defined as the flow channel which carries more than 50 percent of the total discharge which enters the housing directly to the exit 16 of the housing.

Figure 7A:
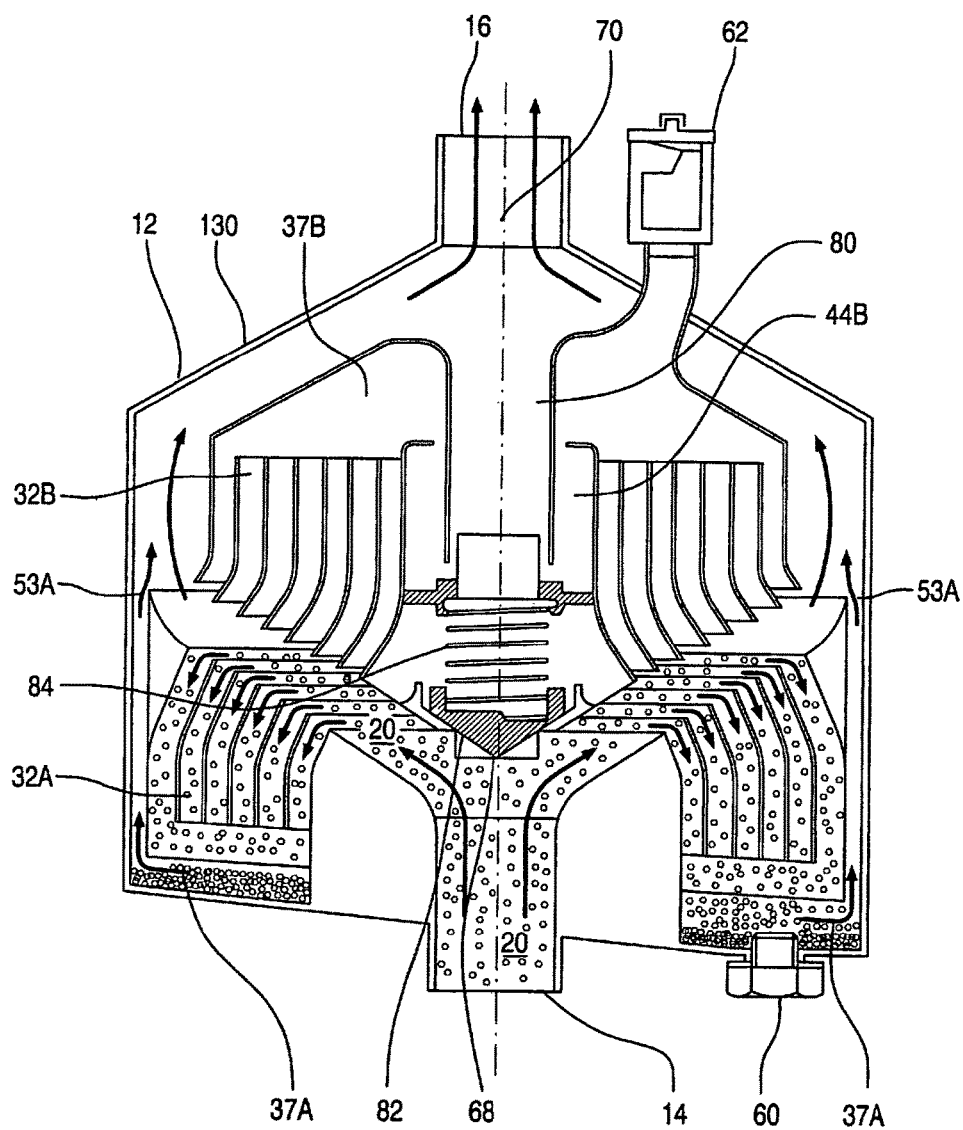
FIGS. 7A, 7B and 7C show cross-sections in side view of another embodiment of a vertically oriented dirt and gas removal device according to a second aspect of the invention.
Figure 7B:
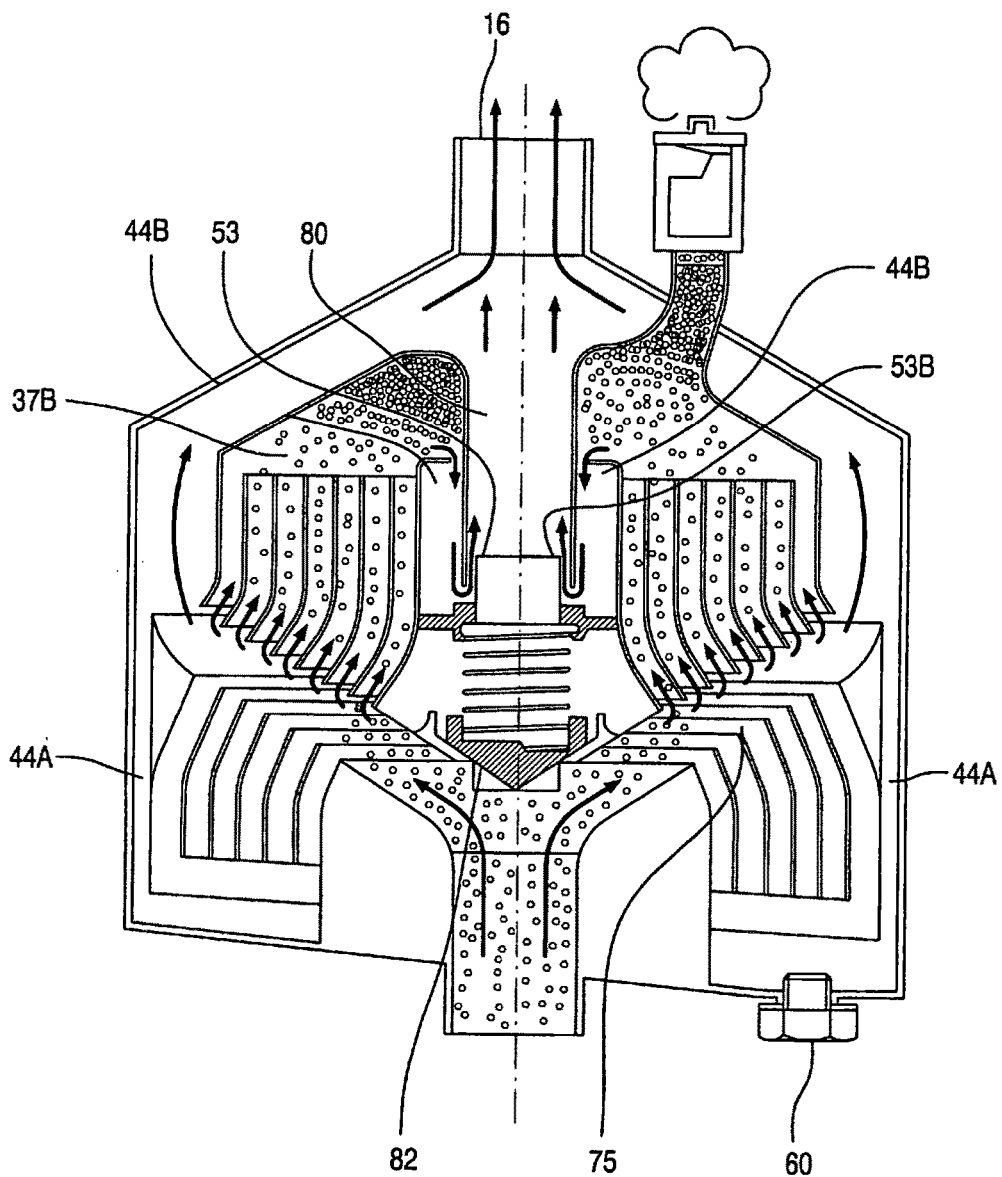
Figure 7C:
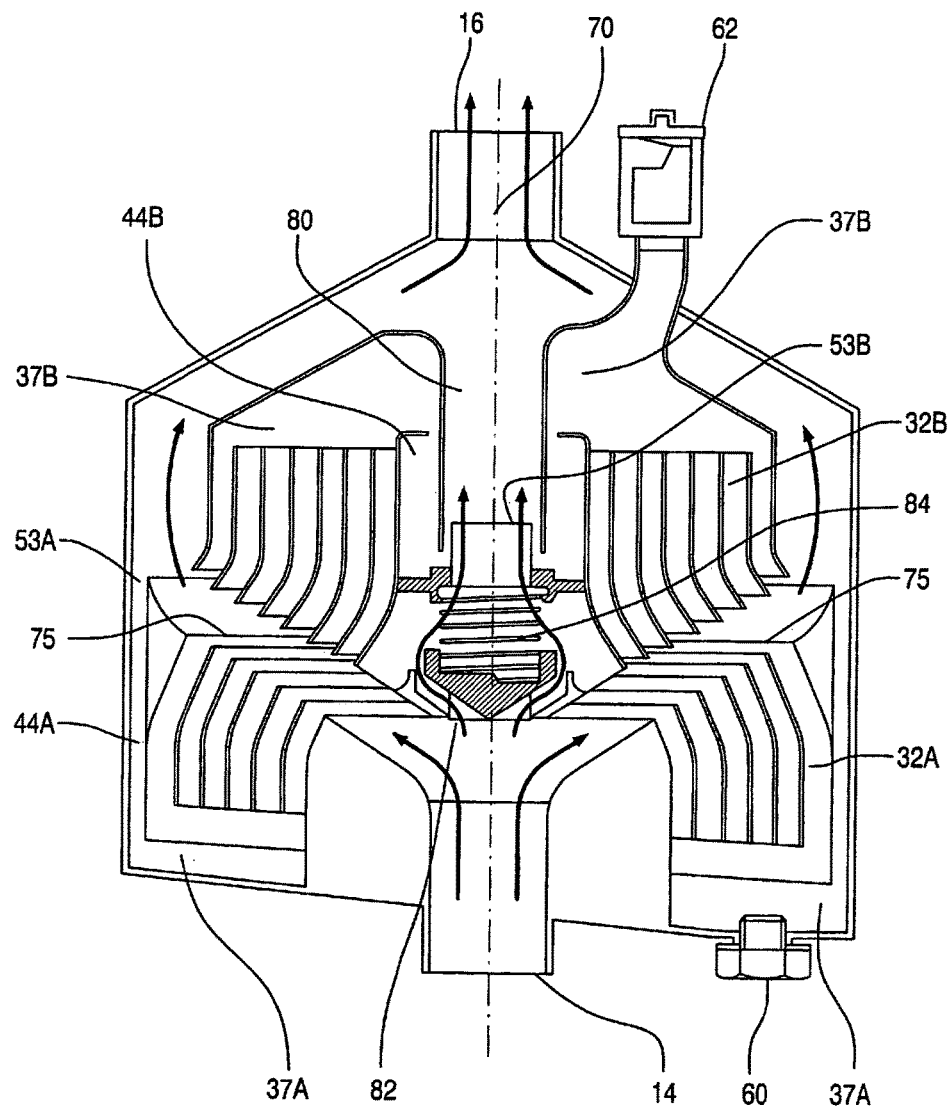

Turning to FIGS. 7A, 7B and 7C, another embodiment of the invention is shown. The embodiment is similar to the embodiment of FIG. 7 with a difference that a central diversion channel 80 is provided and a valve 82 is provided at the bifurcation point 68. The valve 82 is normally closed, but can open up by the pressure of the liquid against a biasing force provided by a spring 84.

The return channel 44B is provided at a different location i.e. relatively more inward, near the main axis 70 and the central diversion channel 80. The return channel 44B ends in the central channel 80.

In use, the valve 82 is normally closed and the central diversion channel 80 does not have a discharge upstream of the merge point 53B. This is shown in FIGS. 7A and 7B.

The valve 82 opens up, see FIG. 8C, when the velocity (and the discharge) of the main flow is too high. Then, the central diversion channel 80 opens up and a part of the flow flows through the central diversion channel 80.

The advantage is that the dirt and gas removal device 10 continues to work properly for a higher discharge than the embodiment of FIG. 7. The dirt and gas removal device thus has a greater operating range of discharges.

Figure 8:
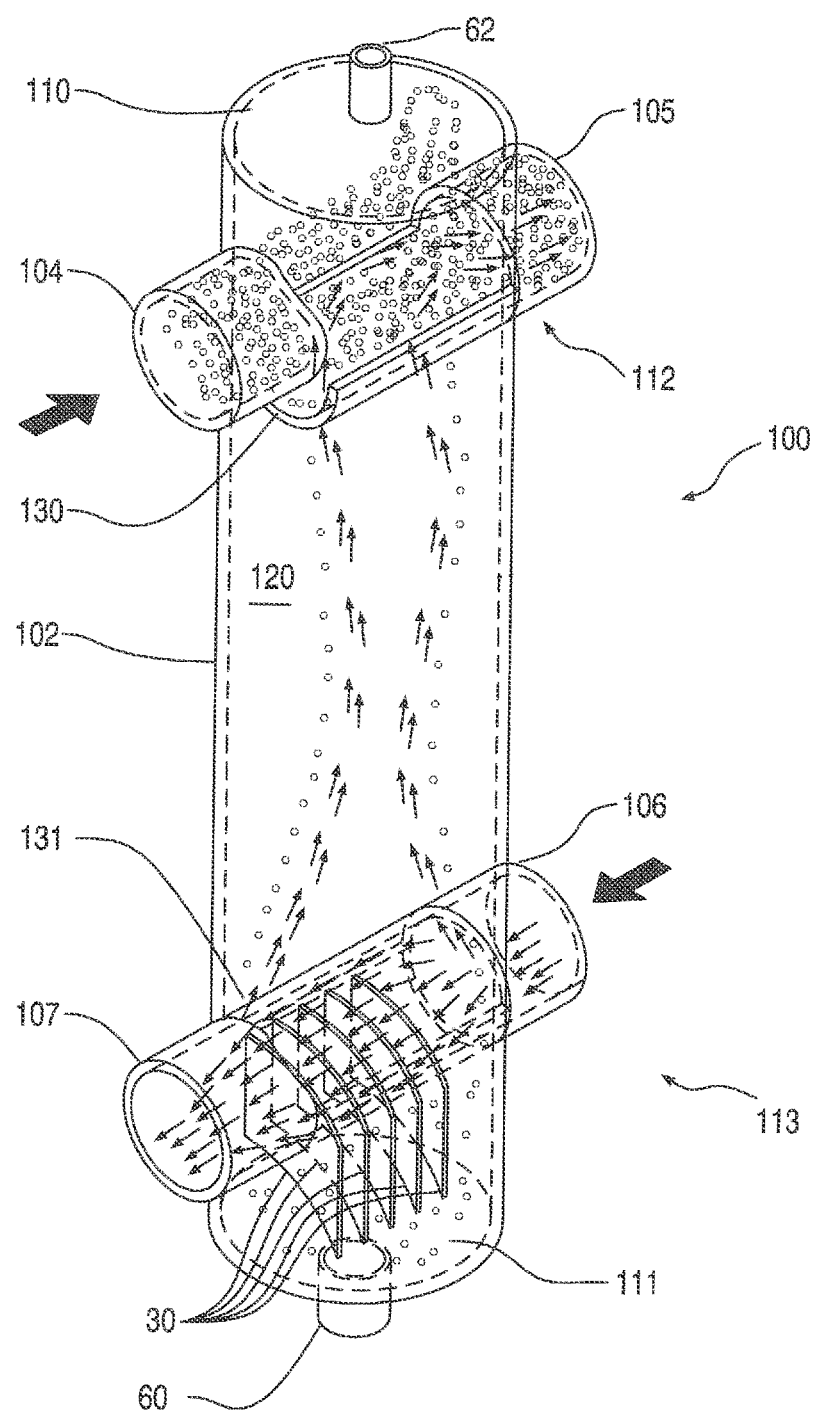
FIG. 8 shows an orthogonal view of a hydraulic separator according to the invention.
Figure 9:
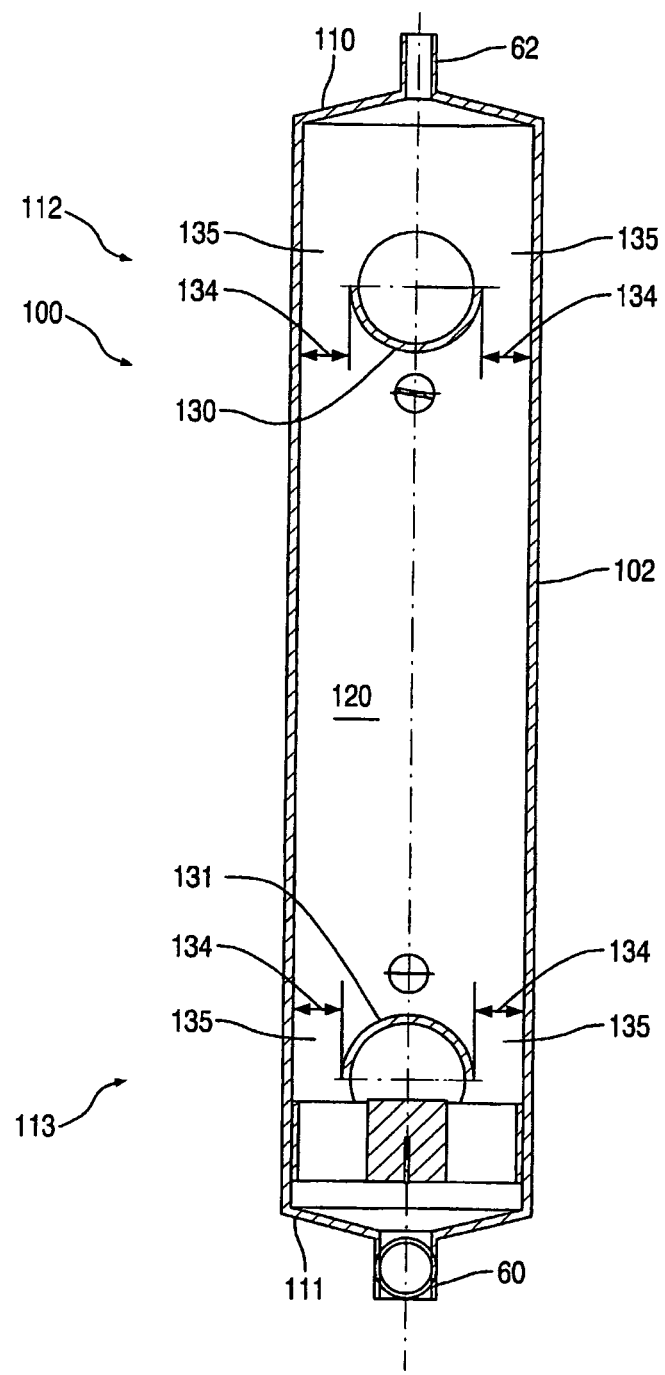
FIG. 9 shows a front view of a hydraulic separator according to the invention.
Figure 10:
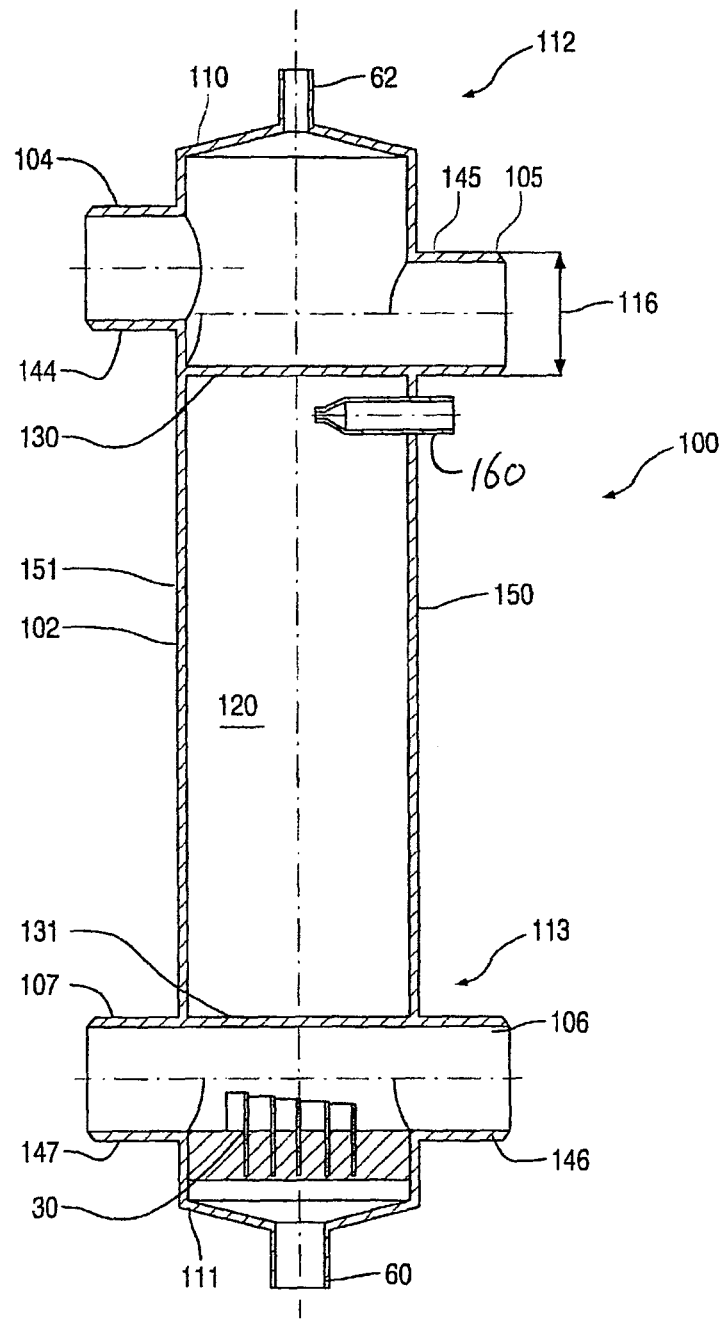
FIG. 10 shows a side view of a hydraulic separator according to the invention.

Turning to FIGS. 8, 9 and 10, a hydraulic separator 100 according to the invention is shown. The hydraulic separator comprises a housing 102, an upper entry 104, an upper exit 105, a lower entry 106 and a lower exit 107. The entries 104, 106 and exits 105, 107 comprise respective short pipe sections 144, 145, 146, 147.

The hydraulic separator 100 comprises an upper end 110 and a lower end 111. The hydraulic separator comprises an upper region 112 and a lower region 113.

In top view, the hydraulic separator is circular or substantially circular.

The upper entry and the lower exit 107 are constructed to be connected to a primary liquid circuit. The upper exit 105 and the lower entry 106 are constructed to be connected to a secondary liquid circuit.

The upper entry and upper exit are positioned at a distance from the lower entry and lower exit. A fluid communication channel 120 is defined between the upper region 112 and lower region 113 by the housing 102.

The upper exit 105 is provided somewhat lower than the upper entry 104. More particularly, the upper exit 105 is at a distance of half a diameter 116 of the upper exit 105 lower than the upper entry 104.

The hydraulic separator 100 also functions as a dirt and gas removal device, and for this end is equipped with curved plates 30.

The cross-section of the fluid communication channel 120 is defined by the diameter of the housing 102.

A first flow obstruction member 130 is provided in the fluid communication channel 120. The flow obstruction member 130 constricts the fluid communication channel 120. The flow obstruction member 130 constricts the fluid communication channel 120 without obstructing the flow from the upper entry 104 to upper exit 105. The flow obstruction member 130 is configured to provide an unobstructed, free passage from the upper entry 104 to the upper exit 105. This results in a low pressure drop from the entry 104 to the exit 105 in use. The flow obstruction member 130 provides a passage 135 on either side of the flow obstruction member 130. The passages 134 have a width 134 which creates a combined cross-sectional area which is smaller than the cross-sectional area of the fluid communication channel 120.

The flow obstruction member 130 is an extension of a pipe section 145 which forms part of the upper exit 105. More particularly, the flow obstruction member 130 is an extension of the lower portion of said pipe section 145.

In a same way, a flow obstruction member 131 is formed in a lower region 113 of the housing 102. The flow obstruction member 131 forms an extension of the pipe section 146, 147 which forms the lower entry 106 and lower exit 107, more particularly an extension of only the upper half of the pipe section 146, 147.

The flow obstruction member 131 constricts the fluid communication channel 120 without obstructing the flow from the lower entry 106 to the lower exit 107. The flow obstruction member 131 is configured to provide an unobstructed, free passage from the lower entry 106 to the lower exit 107. This results in a low pressure drop from the entry 106 to the exit 107 in use.

The flow obstruction members 130, 131 extend from one side 150 of the housing 102 to an opposite side 151 of the housing 102.

In use, the entry 104 and the exit 107 is connected to a primary circuit. The exit 105 and the entry 106 are connected to a secondary circuit.

When a sudden variation in discharge occurs, a leak flow starts to flow from the upper entry 104 to the lower exit 107 or from the lower entry 106 to the upper exit 105.

The leak flow flows through the fluid communication channel 120 and is obstructed by the flow obstruction members 130. The leak flow flows through the passages 134.

In this way, the flow obstruction members 130 regulate the leak flow and prevent the leak flow from becoming too large.

Figure 11:
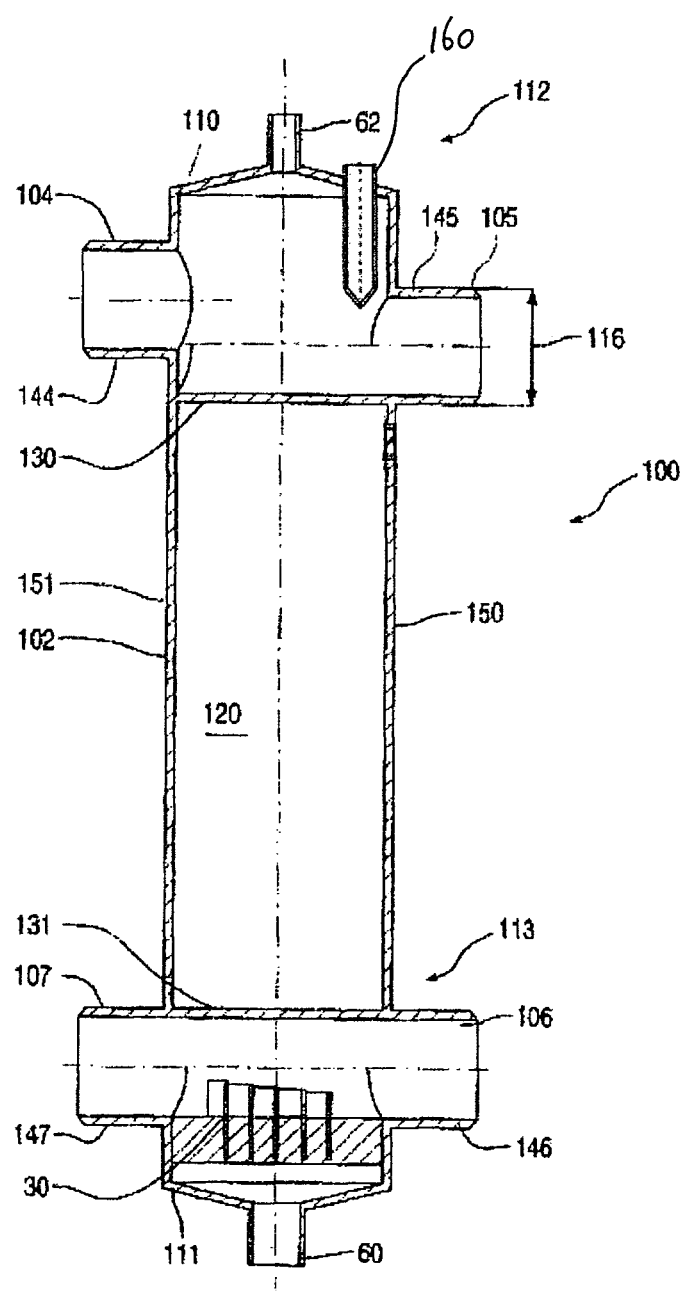
FIG. 11 shows a side view of another hydraulic separator according to the invention.

The configuration of the flow obstruction member 130 has an advantage in that if in use a leak flow occurs, the flow from the upper entry 104 to the upper exit 105 is mixed with a leak flow which flows through the fluid communication channel 120. The mixing takes place in a region above the flow obstruction member 130. This results in a relative homogenous liquid in said region. This in turn allows for sampling in said region, i.e. of a temperature or another kind of sampling. In FIG. 10, a temperature sensor 160 is shown directly underneath the upper exit 105. However, due to the relative homogenous character of the flow above the flow obstruction member 130, it is also possible to position said temperature sensor 160 above the flow obstruction member 130. In this way, the temperature of the flow coming from a heating device can be measured. This variant is shown in FIG. 11.

It will be obvious to a person skilled in the art that the details and the arrangement of the parts may be varied over considerable range without departing from the scope of the claims.

The invention claimed is:

1. A removal device for removing gas bubbles and/or dirt particles from a liquid in a liquid conduit system, the removal device comprising:
   a housing having an entry with an opening and an exit with an opening, the housing defining an inner space within the housing and defining a main flow axis extending from the opening of the entry to the opening of the exit,
   a main ongoing flow channel which extends through the housing along the main flow axis from the opening of the entry to the opening of the exit,
   a plurality of branch flow channels, each branch flow channel branching off from the main flow channel at a branch point, the branch flow channels being configured to—in use—branch off a portion from a main flow with more than 50 percent of the main flow remaining in the main flow channel,
   at least one quiet zone which is provided at the ends of the branch flow channels, such that in use the branch flow channels discharge into the at least one quiet zone, wherein the dimensions of the quiet zone is larger than the combined dimensions of the branch flow channels and the velocity of the liquid in the at least one quiet zone is smaller than in the main flow channel to allow dirt to settle and/or gas bubbles to form and rise in the at least one quiet zone,
   at least one return flow channel for a return flow from the at least one quiet zone back to the main flow channel, wherein the return flow channel merges with the main flow channel at a merge point,
   wherein the branch flow channels are defined by curved plates which extend from the main flow channel to the at least one quiet zone,
   wherein a number of lower curved plates are positioned below the main flow channel, said lower curved plates defining between them lower branch flow channels wherein the lower branch flow channels extend downward from the main flow channel to a lower quiet zone for dirt removal, wherein the lower curved plates have upper edges which define the entrances to the lower branch flow channels, the main flow channel being located above the lower curved plates, wherein when seen in top view an angle between a central flow axis and the upper edges of the lower plates varies over the width of the main flow channel, and/or,
   wherein a number of upper curved plates are positioned above the main flow channel, said upper curved plates defining between them upper branch flow channels, wherein the upper branch flow channels extend upward from the main flow channel to an upper quiet zone for gas removal, wherein the upper curved plates have lower edges which define the entrances to the upper branch flow channels, the main flow channel being located below the upper curved plates, wherein when seen in top view an angle between a central flow axis and the lower edges of the upper plates varies over the width of the main flow channel,
   wherein the curved plates extend in a horizontal direction from a left side of the housing to a right side of the housing,
   wherein the main flow channel extends across the width of the housing,
   wherein the curved plates distribute the main flow over said width of the housing; and
   wherein each curved plate has a concave side and an opposite convex side, wherein in top view the convex side faces upstream and the concave side faces downstream.

2. The removal device according to claim 1, wherein the curved plates have edges at the side of the main flow channel, wherein an entrance of each branch flow channel is located between the edges of adjacent curved plates, wherein a central flow axis of the main flow channel extends from a center of the entry to a center of the exit, wherein the edges have a curved form, such that—when seen in top view—an angle between the central flow axis and the edges varies over the width of the main flow channel.

3. The removal device according to claim 1, wherein a center portion of the curved plates is oriented at a substantially right angle with the central flow axis, and wherein an angle between the curved plates and the central flow axis decreases with an increasing distance from the center portion of the plates.

4. The removal device according to claim 1, wherein in top view the curved plates have a form of a part of a circle or part of an oval.

5. The removal device according to claim 1, wherein in top view the housing has a substantially circular form, and wherein the curved plates extend from a left side of the housing to a right side of the housing.

6. A method of removing gas bubbles and/or dirt particles from a liquid in a liquid conduit system, the method comprising:
   providing a removal device according to claim 1, and guiding a liquid flow through the removal device.

* * * * *